United States Patent
Bahl et al.

(10) Patent No.: US 7,603,708 B2
(45) Date of Patent: Oct. 13, 2009

(54) SECURING NETWORK SERVICES USING NETWORK ACTION CONTROL LISTS

(75) Inventors: Pradeep Bahl, Redmond, WA (US); Ramesh Chinta, Sammamish, WA (US); Narasimha Rao S. S. Nagampalli, Kirkland, WA (US); Scott A Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 877 days.

(21) Appl. No.: 11/181,376

(22) Filed: Jul. 13, 2005

(65) Prior Publication Data

US 2007/0016675 A1 Jan. 18, 2007

(51) Int. Cl.
G06F 11/00 (2006.01)
G06F 12/14 (2006.01)
G06F 12/16 (2006.01)
G08B 23/00 (2006.01)

(52) U.S. Cl. .......................................... 726/22; 726/4
(58) Field of Classification Search ................ 726/4, 726/23, 22
See application file for complete search history.

(56) References Cited

U.S. PATENT DOCUMENTS

| | | | |
|---|---|---|---|
| 5,974,149 A * | 10/1999 | Leppek | 713/164 |
| 6,088,451 A | 7/2000 | He | |
| 6,134,591 A | 10/2000 | Nickles | |
| 6,189,104 B1 * | 2/2001 | Leppek | 726/1 |
| 6,397,336 B2 * | 5/2002 | Leppek | 726/4 |
| 6,941,465 B1 * | 9/2005 | Palekar et al. | 726/1 |
| 7,523,499 B2 * | 4/2009 | Wilkins et al. | 726/23 |
| 2001/0001156 A1 * | 5/2001 | Leppek | 713/201 |
| 2003/0051026 A1 | 3/2003 | Carter | |
| 2004/0088563 A1 * | 5/2004 | Hogan et al. | 713/200 |
| 2004/0162996 A1 * | 8/2004 | Wallace et al. | 713/201 |
| 2004/0268145 A1 * | 12/2004 | Watkins et al. | 713/201 |
| 2005/0216955 A1 * | 9/2005 | Wilkins et al. | 726/23 |
| 2006/0230281 A1 * | 10/2006 | Hofmann | 713/182 |
| 2007/0143827 A1 * | 6/2007 | Nicodemus et al. | 726/2 |
| 2007/0143851 A1 * | 6/2007 | Nicodemus et al. | 726/25 |
| 2008/0120499 A1 * | 5/2008 | Zimmer et al. | 713/2 |
| 2009/0021349 A1 * | 1/2009 | Errico et al. | 340/5.82 |

* cited by examiner

Primary Examiner—David García Cervetti
(74) Attorney, Agent, or Firm—Workman Nydegger (57) ABSTRACT

A computer system having secured network services is presented. The computer system comprises a processor, a memory, and a network action processing module. The network action processing module processes network actions from one or more network services executing on the computer system. The computer system is further configured to execute at least network service performing network actions in conjunction with the network action processing module. Upon receiving a network action from a network service, the network action processing module determines whether the network action is a valid network action according to a network action control list. If the network action is determined to not be a valid network action, the network action is blocked. Alternatively, if the network action is determined to be a valid network action, the network action is permitted to be completed.

20 Claims, 6 Drawing Sheets

SECURING NETWORK SERVICES USING NETWORK ACTION CONTROL LISTS

BACKGROUND

As almost any computer user is aware, malware is a constant threat to any computer connected to the Internet. Malware (a term credited as the concatenation of "malicious software") refers to a program or file that is harmful. Thus, malware includes computer worms, viruses, Trojan horses, and spyware, as well as computer system attacks that misuse or abuse legitimate computer and/or network system features and services.

It used to be that most malware was directed at corrupting or harming a computer system. Erased or corrupted hard drives were the typical consequence of an infected computer system. Unfortunately, the purposes behind recent versions of malware include malicious intents that are much more nefarious than simply corrupting or disrupting the computer system. More particularly, malware is now used to steal personal information in order to perpetrate frauds and identity theft, to access bank accounts, and the like. Detecting the effects of a malware infection is now more difficult because, unlike earlier malware consequences, the object is not to shut down an infected computer, but rather leave it running so that more and more information can be illicitly harvested.

To combat malware, it is almost essential that a network connected computer use anti-virus software (which now would be more aptly called anti-malware software) to protect against infection. Additionally, many computer users also rely upon hardware and/or software firewalls in conjunction with anti-virus software, to protect the computer. Unfortunately, even behind the shields of anti-virus software and firewalls, some malware threats, especially new forms of malware, are successful in infecting computer systems. And, as those skilled in the art will appreciate, once malware has infected a computer system, the malware often uses the infected computer system to infect other computer systems.

A computer system's network services, i.e., those processes that form the communication channels to and from an external network, are a primary target of malware and are particularly vulnerable. In some instances, malware may coerce a network service to perform an action that permits other processes to further compromise the computer system. For example, an unprotected network service may be directed to open a communication port that allows a third party to access the computer system and, thereby, gain control of the computer system. A rogue application, delivered in an infected email, could successfully direct the network services to open the unsecured port. Unfortunately, once a network service is compromised, the computer is open to the malicious intent of the malware.

As mentioned above, it is not always possible to prevent a malware infection. However, even when a computer system is infected, it would be beneficial to contain the infection by preventing a network service from performing network actions that would compromise, or further compromise, the computer system. Indeed, it would be very useful if network services could be constrained to "good" network actions.

SUMMARY

A computer system having secured network services is presented. The computer system comprises a processor, a memory, and a network action processing module. The network action processing module processes network actions from one or more network services executing on the computer system. The computer system is further configured to execute at least one network service performing network actions in conjunction with the network action processing module. Upon receiving a network action from a network service, the network action processing module determines whether the network action is a valid network action according to a network action control list. If the network action is determined to not be a valid network action, the network action is blocked. Alternatively, if the network action is determined to be a valid network action, the network action is permitted to be completed.

A computer-readable medium bearing computer-executable instructions is also presented. When executed on a networked computer, the computer-executable instructions carry out a method for securing network services on the computer. This method comprises receiving a network action from a network service. A determination is made as to whether the network action should be further validated as a valid network action. If the network action should be further validated, a determination is made as to whether the network action is a valid network action for the network service according to a network action control list. If the network action is not a valid network action according to the network action control list, the network action is blocked. If the network action is a valid network action according to the network action control list, the network action is permitted.

A method for securing network services on a computing device connected to a network is further presented. The method comprises receiving a network action from a network service operating on the computing device. A determination is made as to whether the network action is of a type that should be verified as being a valid network action. If the network action is of a type that should be verified as being a valid network action, a network service identifier is obtained. The network service identifier uniquely identifies the network service. A determination is made as to whether the network action is a valid network action for the network service according to one or more entries in a network action control list that correspond to the network service as identified by the network service identifier. If it is determined that the network action is not a valid network action according to the network action control list, the network action is blocked.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
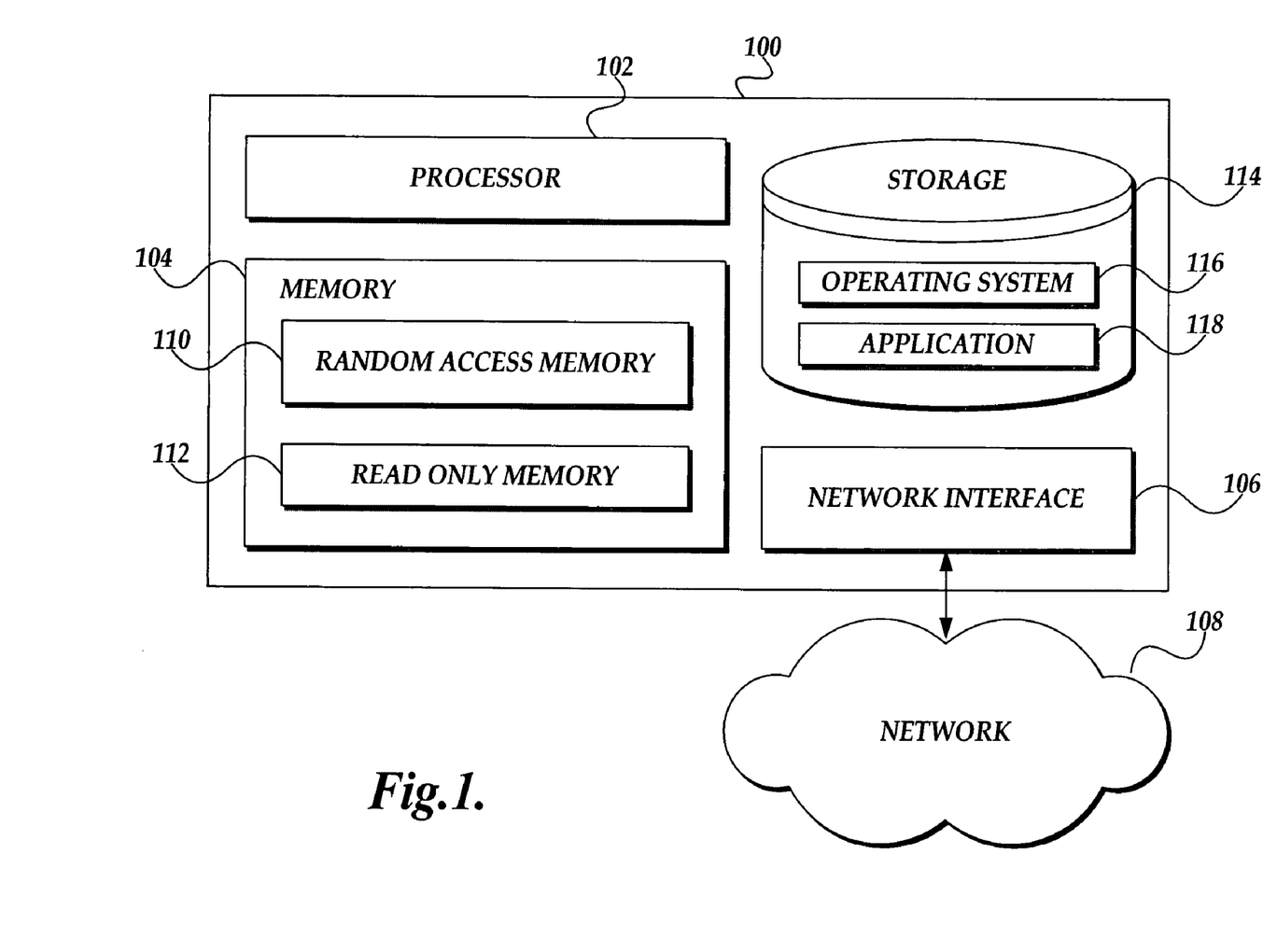
FIG. 1 is a block diagram illustrating exemplary hardware components of a computer system suitable for implementing secured network services.

As indicated above, FIG. 1 is a block diagram illustrating exemplary hardware components of a computer system 100 suitable for implementing secured network services. While a computer system will include numerous components, the exemplary computer system 100 includes a processor 102, a memory 104, and a network interface 106 for interfacing the computer system 100 with a network 108. As appreciated by those skilled in the art, the memory 104 includes both random access memory 110 and read-only memory 112.

Also illustrated is a non-volatile storage 114. As those skilled in the art will appreciate, while some computing devices, including some hand-held computing devices, exclusively use non-volatile memory as their non-volatile storage medium, the typical non-volatile storage medium is a magnetic hard drive. Whatever the actual medium, the storage 114 typically stores the operating system 116 (including operating system-provided network services) and one or more applications, such as application 118.

The exemplary computer system 100 is also shown as including a network interface 106. The network interface 106 is the computer system's hardware that interfaces with the network 108. While the network interface is typically embodied as hardware specifically designed for network communication, the network interface 106 may be a serial connection, a universal serial bus (USB) connection, an infrared connection, an IEEE 1394 connection, and the like.

In light of the above, suitable computer systems providing secured network services include, but are not limited to, personal computers, laptop and notebook computers, personal digital assistants (PDAs), hybrid PDA/mobile phone devices, mobile phones with network connection abilities, mini- and mainframe computers, and the like.

Figure 2:
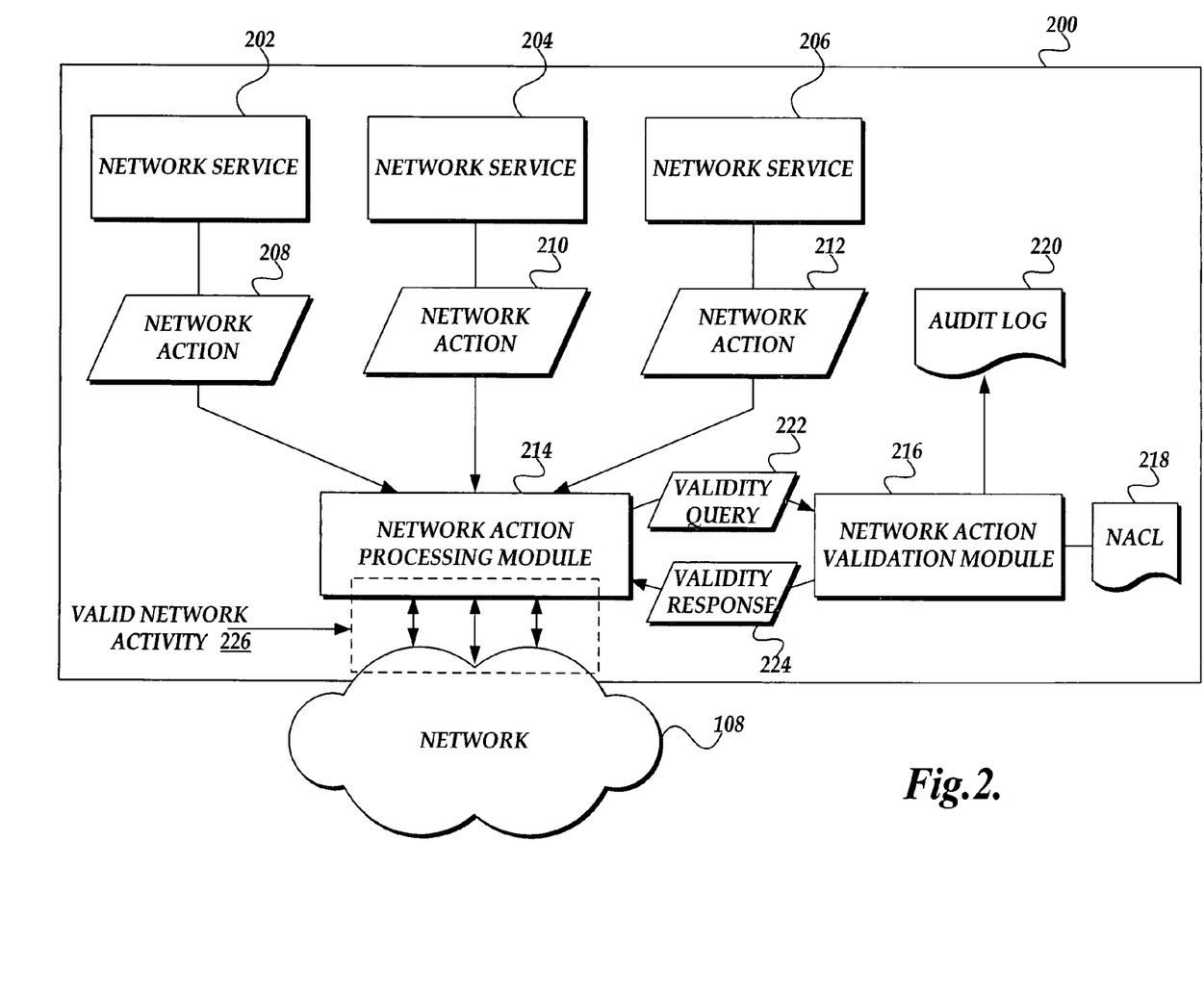
FIG. 2 is a block diagram illustrating a computer system with secured network services such that only valid network activity is permitted between the computer system and the network.

FIG. 2 is a block diagram illustrating an exemplary computer system 200 with secured network services such that only valid network activity 226 is permitted between the computer system and the network 108. Illustrated in the exemplary computer system 200 are three network services 202-206. Of course, the illustration of three network services is merely for display and simplicity purposes, and should not be construed as limiting upon the present invention.

Network services provide communication to/from a network 108 by performing various network actions, illustrated as network actions 208-212, such as opening a communication port, reading and/or writing information to a memory location associated with the communication port, listening on the network for data packets directed to the computer system 200, and the like. Each network action includes information necessary to complete the action, such as, but not limited to, the source address (IP address of the originating computer system), a source port indicating the source end port of the communication channel, a protocol, information identifying the action to be taken as well as data relevant to that action, destination port, destination address, and the like. Additionally, according to aspects of the present invention, the network action includes information that uniquely identifies the originating network service, such as a network service identifier. Of course, those skilled in the art will appreciate that, with respect to the included information identifying the originating network service, such information may not necessarily be included in the network action, but may be bundled with the network action and/or determinable from the manner in which the network action is submitted. In any event, in order to constrain network actions to valid network actions, the originating network service of a network action must be identifiable. Accordingly, including the identifying information in the network action should be viewed as illustrative of one embodiment, and not construed as limiting upon the present invention. As will be described further below, the identity of the originating network service is one factor that may be used in determining whether the network action is a valid network action.

In order to ensure that only valid network actions 226 pass between the computer system 200 and the network 108, network actions must pass through a network action processing module 214. As network actions, such as network actions 208-212, are received, the network action processing module 214 briefly examines each action and determines whether the action should be evaluated by a network action validation module 216 to determine whether the action is a valid network action.

Those network actions that the network action processing module 214 determines should not be validated by the network action validation module 216 are allowed to be completed. Alternatively, if the network action is to be further examined, the network action processing module 214 sends a validity query 222 to the network action validation module 216. Typically, the validity query 222 will include the network action in question, but may, alternatively, include only information necessary for the network action validation module 216 to determine whether the network action is a valid network action 226.

Responsive to the validity query 222, the network action validation module 216 returns a validity response 224 indicating whether the network action is a valid network action or not. If the validity response 224 indicates that the network action is a valid network action, the network action processing module 214 allows the network action to complete. Alternatively, if the validity response 224 indicates that the network action is not a valid network action, the network action processing module 214 terminates the network action, i.e., does not allow the network action to complete.

In determining whether the network action is a valid network action, the network action validation module 216 compares various aspects of the network action against a network action control list 218. The network action control list 218 comprises a set of rules or conditions, that if met, identify a network action as a valid or invalid network action. These rules/conditions may include "black list" rules that generally or specifically identify certain network actions as invalid network actions, as well as "white list" rules that generally or specifically identify certain network actions as valid network actions. The validity/invalidity of a given network action may be based on one or a combination of many factors from the network action including, but not limited to, the source or destination IP address, the network service generating the network action (per its network service identifier), the type of action, the protocol used, the port being used as source end point or destination end point, and the like. These factors, when treated together, can be viewed as a "network object" on which the network action operates. This "network object" can be utilized as part of the network access control list.

In addition to validating/invalidating network actions, the network action validation module 216 may also keep track of the network actions, and whether or not they are valid network actions, in an audit log 220. The audit log 220 may then be used by system administrators to identify trouble areas, including identifying the possibility that the computer system 200 is infected with malware.

As mentioned above, the network action processing module 214 briefly examines each action and determines whether the action should be evaluated by a network action validation module 216 to determine whether the action is a valid network action. According to one embodiment, this determination is based on the type of the network action. In particular, in a certain embodiment, only network actions that constitute "endpoint" creations are sent to the network action validation module 216 for validation. "Endpoint" creations, as those skilled in the art will appreciate, include those network actions that create and/or open communication channels between the computer system 200 and the network 108. "Endpoint" creation network actions may include, but are not limited to, opening a communication port, creating a connection to a remote entity, listening on a port for connections, and the like. Alternatively, the network action processing module 214 could be configured to perform so-called "deep" evaluations by evaluating all network actions that pass through the network action processing module 214. Other levels of examination may also be implemented.

With regard to the network action processing module 214, while this module may be a separate component from other operating system components (especially network related operating system components), the above-described functionality may be suitably integrated into one or more existing components. For example, Microsoft Corporation's Windows® operating system software (as well as operating systems from other providers) includes a TCP/IP stack processing component (often referred to generally as the TCP/IP stack) through which all TCP, UDP, and IP based actions/communications are processed. As all TCP, UDP, and IP actions flow through the TCP/IP stack, by integrating the above-described functionality into the TCP/IP stack, the network services 202-206 need not be modified to secure them from performing invalid network actions. Similarly, other communication protocols typically incorporate a central processing module into which the above described functionality may be integrated. However, while it may be beneficial to integrate the functionality of the above-described network action processing module 214 into one or more existing components, the present invention should not be construed as so limited.

Figure 3:
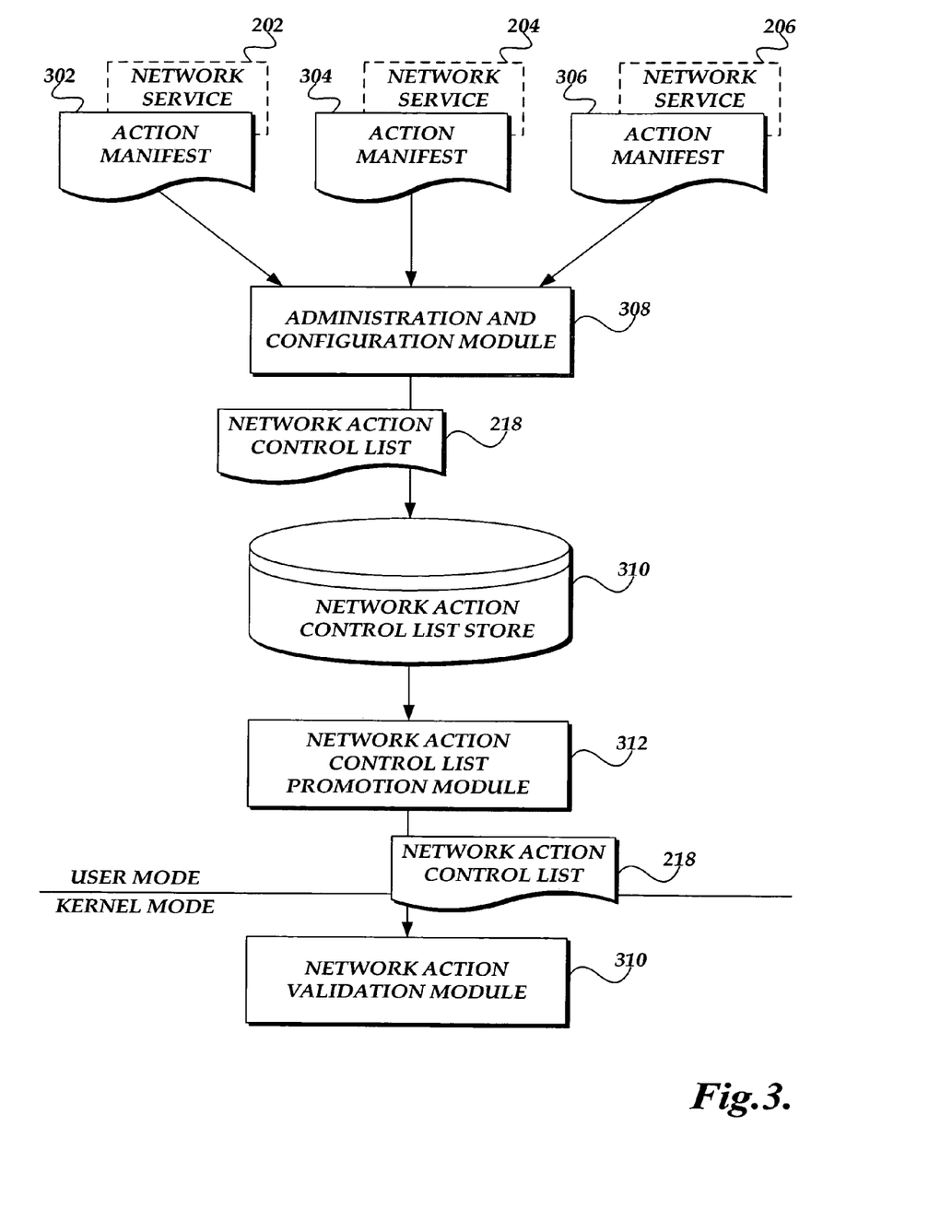
FIG. 3 is a block diagram illustrating the process of generating a network action control list, and of promoting the network action control list to the network activity validation module.

While there are numerous ways in which a network action control list 218 may be derived, according to one embodiment, the network action control list is generated from information provided by the developers and/or providers of the individual network services. FIG. 3 is a block diagram illustrating the process of generating the network action control list 218, and of promoting it to the network activity validation module 216. In particular, as network services are developed and/or deployed, such as network services 202-206, the developer or provider of the network service also provides a corresponding action manifest, such as action manifests 302-306. Action manifests describe the permissible and/or intended network actions (with associate information such as a network object described above) of the corresponding network services. For example, if the developer and/or provider of network service 202 intended that the network service only open and communicate through ports 88 and 144, this information is included in its corresponding action manifest 302. Additionally, each action manifest should include information identifying the corresponding network service, such as the network service identifier described above.

The action manifests 302-306 are processed by an administration and configuration module 308 wherein an administrator can accept the "recommendations" provided by the action manifests, or modify them according to security needs. Additionally, using the administration and configuration module 308, an administrator may add additional rules and/or conditions with regard to one or more network services according to security policies relevant to the administrator or prevailing network conditions.

From these action manifests, additional conditions and rules, and administrator configurations and modifications, the administration and configuration module 308 generates an action control list and stores this list in a network action control list store 310. According to one embodiment, the network action control list store 310 is the computer system's registry. One advantage of using the computer system's registry is that certain regions of the registry are protected from modification, except by an administrator. This security measure protects the network action control list from becoming corrupted by a malware infection that could lead to further corruption and the allowance and completion of invalid network actions.

As those skilled in the art will appreciate, the administration and configuration module 308 operates in user mode with regard to the operating system. Typically, however, the network action processing module 214 (as well as the network services 202-206) will be operating in kernel mode, i.e., the core of the operating system that manages memory, files, and peripheral devices, launches applications, allocates system resources, and the like. Thus in order to transfer the network action control list from the network action control list store 310 to the network action validation module 216 (which operates in kernel mode with the network action processing module 214), a promotion module 312 that includes a user mode/kernel mode communication channel transfers the network action control list 218 to the network action validation module.

Figure 4:
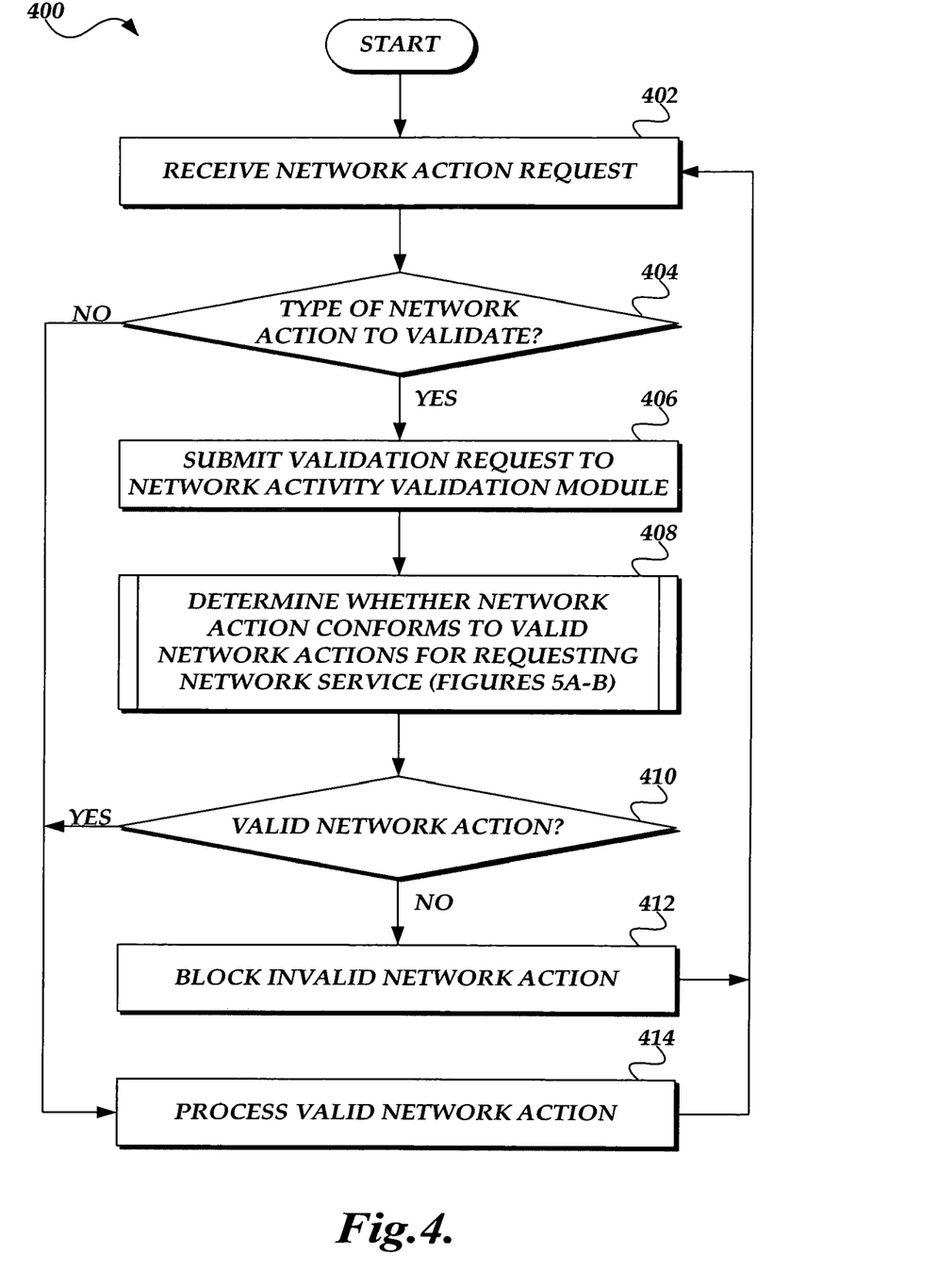
FIG. 4 is a flow diagram illustrating an exemplary routine for processing network actions in a computer system having secured network services.

FIG. 4 is a flow diagram illustrating an exemplary routine 400 for processing network actions in a computer system having secured network services. Beginning at block 402, the network action processing module 214 receives a network action. At decision block 404, a determination is made as to whether the network action is of the type to validate. As described above, according to one embodiment, only network actions that are endpoint creations are of the type that are validated.

If the network action is not of the type to further validate, the routine 400 proceeds to block 414 where the network action, presumably a valid network action, is processed, i.e., allowed to be completed. Alternatively, if the network action is of the type to further validate, at block 406, a validity query 222 (FIG. 2) is forwarded to the network activity validation module 216.

At block 408, the network action validation module 216 determines whether the network action of the validity query 222 is a valid network action for the requesting network service according to the network action control list 218. Determining whether a network action is a valid network action according to the network action control list 218 is described below in regard to FIGS. 5A and 5B.

Figure 5A:
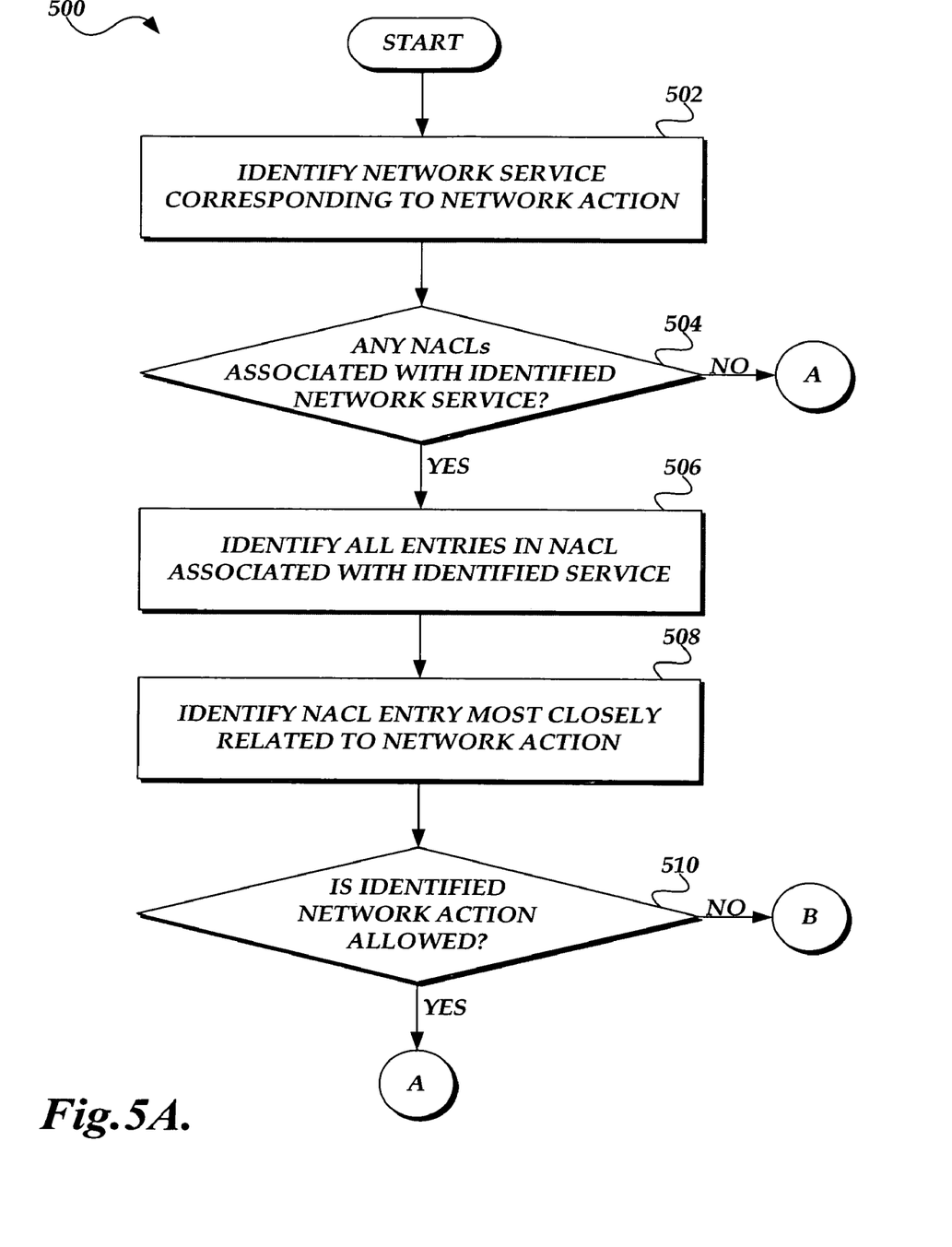
FIGS. 5A and 5B are a flow diagram illustrating an exemplary subroutine for determining whether a network action is a valid network action according to a network action control list.
Figure 5B:
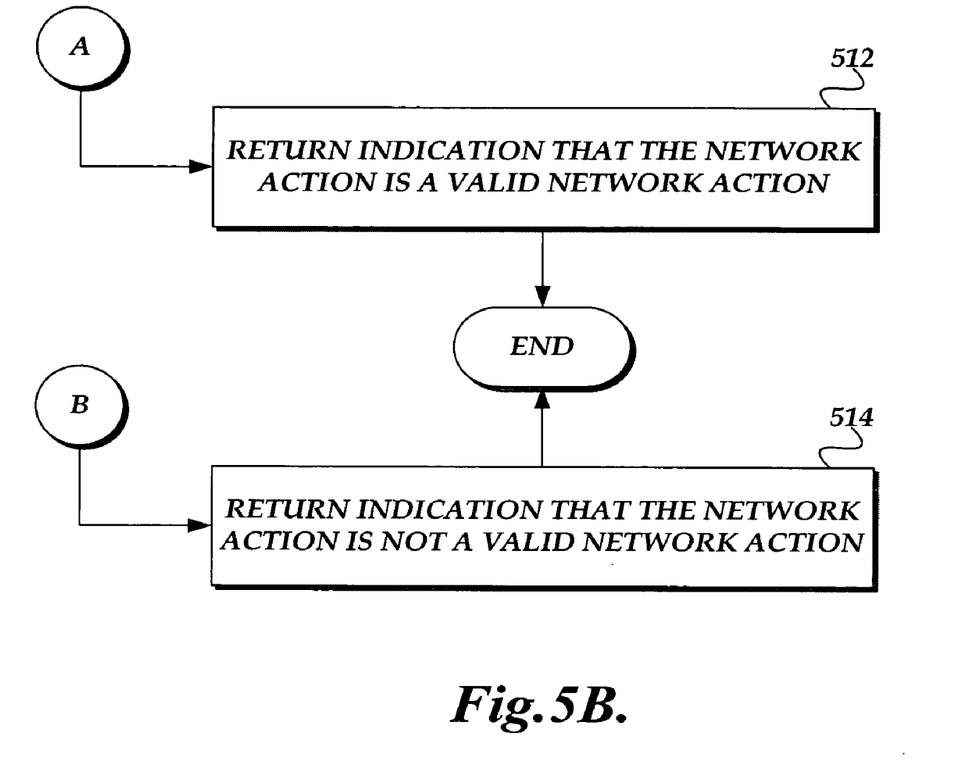

FIGS. 5A and 5B are a flow diagram illustrating an exemplary subroutine 500 for determining whether a network action is a valid network action according to a network action control list 218.

Beginning at block 502, the network activity validation module 216 identifies the network service corresponding to the network action which is the subject matter of the validity query 222. While this may be accomplished in a variety of manners, according to one embodiment, the network service's network service identifier is obtained for the network action. In one embodiment, the network service identifier is obtained from a process token of the process hosting the network service. For example, in some versions of Microsoft Corporation's Windows® operating systems, the process token is the context which the operating system associates with a process for storing identification and privilege information about programs running in the process.

At decision block 504, a determination is made as to whether there are specific entries in the network access control list 218 that correspond to the identified network service. If no entries corresponding to the network service are found, at block 512 (FIG. 5B), a validity response 224 is returned to the network action processing module 214 indicating that the network action is a valid network action, and the subroutine 500 terminates. By defaulting to a presumption of validity in the absence of any entry corresponding to the identified network service, it is presumed that a behavior manifest has not been generated for the network service, or has not been included in the network action control list 218. In either event, rather than shutting down all activity for this network resource, which may be the effect if a presumption is made that its network actions are invalid, the network actions are permitted. Clearly, in an alternative embodiment, the default could be that of invalidity. Similarly, the complete lack of entries in the network action control list 218 corresponding to the identified network service could generate a special entry in the audit log 220, flagging the network service for special attention by an administrator.

If, at decision block 504, an entry corresponding to the network service is found in the network action control list 218, the subroutine 500 proceeds to block 506. At block 506, all entries in the network action control list 218 that correspond to the identified network service are identified. At block 508, of the identified entries, the entry that most closely corresponds to the network action (i.e., the subject matter of the validity query 222) is identified. At decision block 510, a determination is made as to whether the network action is permitted according to the most closely corresponding entry in the network action control list 218. If the network action is permitted according to the previous determination, at block 512 a validity response 224 is returned to the network action processing module 214 indicating that the network action is a valid network action, and the subroutine 500 terminates. Alternatively, if the network action is not permitted according to the previous determination, at block 514 (FIG. 5B), an invalidity response 224 is returned to the network action processing module 214 indicating that the network action is not a valid network action.

With regard again to FIG. 4, after having obtained a validity response 224 from the network action validity module 216, at decision block 410, the determination is made as to whether the network action is a valid network action. If the network action is not a valid network action, at block 412, the network action is blocked. Alternatively, if the network action is a valid network action, at block 414, the network action is processed (i.e., allowed to complete). Thereafter, the routine 400 returns to block 402 to obtain and process additional network actions.

While various illustrative embodiments have been illustrated and described, it will be appreciated that various changes can be made therein without departing from the spirit and scope of the invention.

The embodiments of the invention in which an exclusive property or privilege is claimed are defined as follows:

1. A computer system having secured network services, the computer system comprising:
   a processor;
   a memory; and
   a network action processing module that processes network actions from one or more network services executing on the computer system, the network action processing module operating in a kernel mode;
   wherein the computer system is configured to execute at least network service performing network actions in conjunction with the network action processing module; and
   wherein the network action processing module, upon receiving from a network service a received network action having a plurality of disparate aspects:
   determines whether the received network action is a valid network action by comparing each of the plurality of disparate aspects to a set of blacklist aspects and a set of whitelist aspects maintained in a network action control list, the blacklist aspects associated with aspects that tend to invalidate a network action, the whitelist aspects associated with aspects that tend to validate a network action, the received network action identified as a valid network action if any of a plurality of combinations of the disparate aspects corresponds to a valid network object;
   blocks the received network action if the previous determination yields that the received network action is not a valid network action; and
   permits the received network action to complete if the previous determination yields that the received network action is a valid network action.

2. The computer system of claim 1 further comprising a network action validation module, and wherein the network action processing module determines whether the received network action is a valid network action by:
   querying the network action validation module as to whether the received network action is a valid network action according to the network action control list, the network validation module having access to the network action control list; and
   receiving a response from the network action validation module indicating whether the received network action is a valid network action.

3. The computer system of claim 2, wherein, upon receiving the received network action, the network action processing module:
   determines whether the received network action is of a type to be validated by the network action validation module; and
   queries the network action validation module as to whether the received network action is a valid network action only if the received network action is of a type to be validated by the network action validation module.

4. The computer system of claim 3, wherein determining whether the received network action is of a type to be validated by the network action validation module comprises determining whether the received network action is an endpoint creation network action.

5. The computer system of claim 3, wherein the network action validation module determines whether the received network action is a valid network action by comparing the disparate aspects to aspects in the network action control list corresponding to the network service that issued the received network action.

6. The computer system of claim 5, wherein each network action is associated with a network service identifier that uniquely identifies the network service issuing the network action; and
   wherein the network action validation module determines whether the received network action is a valid network action by comparing the disparate aspects to aspects in the network action control list corresponding to the network service according to the network service identifier in the received network action.

7. The computer system of claim 6, wherein the network action validation module determines that the received network action is a valid network action if there are no aspects in the network action control list that deny permission to the network service.

8. The computer system of claim 5, wherein the network action validation module further records information regarding the network actions and whether they are valid network actions in an audit log.

9. The computer system of claim 2, wherein the network action control list is generated from at least one action manifest corresponding to a network service, the action manifest identifying valid network actions for the corresponding network service.

10. The computer system of claim 2, wherein the network action processing module is a TCP/IP stack processing module on the computer system.

11. A computer-readable storage medium bearing computer-executable instructions, which, when executed on a networked computer, carry out a method for securing network services on the computer, the method comprising:
employing a processor to execute the computer executable instructions stored on the computer readable storage medium to implement the following acts:
receiving a network action from a network service, the received network action having a plurality of disparate aspects;
determining whether the received network action should be further validated as a valid network action, and if so:
determining whether the received network action is a valid network action for the network service by comparing each of the plurality of disparate aspects to a set of blacklist aspects and a set of whitelist aspects included in a network action control list, the blacklist aspects associated with aspects that tend to invalidate a network action, the whitelist aspects associated with aspects that tend to validate a network action, the received network action identified as a valid network action if any of a plurality of combinations of the disparate aspects corresponds to a valid network object;
blocking the received network action if the received network action is not a valid network action according to the network action control list; and
permitting the received network action to complete if the received network action is a valid network action according to the network action control list.

12. The computer-readable medium of claim 11, wherein determining whether the received network action should be further validated as a valid network action comprises determining whether the received network action is an endpoint creation network action, such that the network action should be further validated if the received network action is an endpoint creation network action.

13. The computer-readable medium of claim 11, wherein determining whether the received network action is a valid network action comprises comparing the received network action to aspects in the network action control list that correspond to the network service.

14. The computer-readable medium of claim 13, wherein the received network action includes a network service identifier that uniquely identifies the network service, and
wherein the method compares the received network action to aspects in the network action control list that correspond to the network service as identified by the network service identifier.

15. The computer-readable medium of claim 14, wherein if there are no aspects in the network action control list corresponding to the network service as identified by the network service identifier, the received network action is determined to be a valid network action.

16. The computer-readable medium of claim 11, wherein the method further comprises logging whether the received network action is a valid network action for the network service to an audit log.

17. The computer-readable medium of claim 11, wherein the network action control list comprises aspects generated from at least one action manifest corresponding to at least one network service.

18. A method for securing network services on a computing device connected to a network, the method comprising:
employing a processor to execute computer executable instructions stored on a computer readable storage medium to implement the following acts:
receiving a network action from a network service operating on the computing device, the received network action having a plurality of disparate aspects;
determining whether the received network action is of a type that should be verified as being a valid network action, and if so:
obtaining a network service identifier uniquely identifying the network service;
determining whether the received network action is a valid network action for the network service by comparing each of the plurality of disparate aspects to one or more blacklist aspects and one or more whitelist aspects included in a network action control list that correspond to the network service as identified by the network service identifier, the blacklist aspects associated with aspects that tend to invalidate a network action, the whitelist aspects associated with aspects that tend to validate a network action, the received network action identified as a valid network action if any of a plurality of combinations of the disparate aspects corresponds to a valid network object; and
blocking the received network action if the received network action is not a valid network action according to the network action control list.

19. The method of claim 18, wherein determining whether the received network action is of a type that should be verified as being a valid network action comprises determining whether the received network action is an endpoint creation network action, and the received network action should be further validated if the received network action is an endpoint creation network action.

20. The method of claim 18, wherein if there are no aspects in the network action control list corresponding to the network service correspond to the network service as identified by the network service identifier, the received network action is determined to be a valid network action.

* * * * *